(12) United States Patent
Omi et al.

(10) Patent No.: US 6,364,274 B1
(45) Date of Patent: Apr. 2, 2002

(54) SEISMIC ISOLATOR FOR EXHIBITS

(75) Inventors: Toshio Omi, Sakura; Minoru Ohiraki, Chiba, both of (JP)

(73) Assignee: Mitsubishi Steel Mfg. Co., Ltd., Tokyo (JP)

( * ) Notice: Subject to any disclaimer, the term of this patent is extended or adjusted under 35 U.S.C. 154(b) by 0 days.

(21) Appl. No.: 09/443,549

(22) Filed: Nov. 18, 1999

(51) Int. Cl.$^7$ ............................................... F16M 13/00
(52) U.S. Cl. ..................... 248/562; 248/580; 248/638; 52/167.5; 52/167.1
(58) Field of Search ............................. 248/638, 562, 248/636, 580; 52/167.2, 167.1, 167.4, 167.5, 167.6, 167.7, 167.8, 292

(56) References Cited

U.S. PATENT DOCUMENTS

| | | | | |
|---|---|---|---|---|
| 4,596,373 A | * | 6/1986 | Omi et al. | 248/562 |
| 4,883,250 A | * | 11/1989 | Yano et al. | 248/638 |
| 4,917,211 A | * | 4/1990 | Yamada et al. | 181/0.5 |
| 5,035,394 A | * | 7/1991 | Haak | 294/562 |
| 5,203,199 A | * | 4/1993 | Henderson et al. | 73/865.3 |
| 5,261,200 A | * | 11/1993 | Sasaki et al. | 52/167.5 |
| 5,934,029 A | * | 8/1999 | Kawai et al. | 52/167.5 |
| 5,970,666 A | * | 10/1999 | Kurabayashi et al. | 52/167.6 |
| 6,085,473 A | * | 7/2000 | Teramachi et al. | 52/167.5 |
| 6,092,780 A | * | 7/2000 | Kurabayashi et al. | 248/636 |
| 6,123,313 A | * | 9/2000 | Otsuka et al. | 248/580 |
| 6,130,490 A | * | 10/2000 | Lee | 310/12 |
| 6,164,022 A | * | 12/2000 | Ishikawa et al. | 52/167.5 |

FOREIGN PATENT DOCUMENTS

| | | | |
|---|---|---|---|
| EP | 0439272 | * | 7/1991 |
| JP | 2-122833 | | 10/1990 |
| JP | 10-26136 | | 1/1998 |
| JP | 1085087 | * | 4/1998 |
| JP | 10292669 | * | 11/1998 |
| JP | 200046108 | * | 2/2000 |

* cited by examiner

*Primary Examiner*—Leslie A. Braun
*Assistant Examiner*—Naschica S Morrison

(57) ABSTRACT

A flat-type seismic isolator for exhibits includes a lower face plate installed on a foundation; an upper face plate that is installed to the lower surface of a seismic isolation object and placed above the lower face plate; an intermediate plate placed between the upper face plate and the lower face plate; and elastic restoring means and damping means provided for returning the plates to their original positions and placed in a lower area between the lower face plate and the intermediate plate and an upper area between the intermediate plate and the upper face plate, respectively. In the lower area, one lower linear guide rail is disposed in the center of the area and guide rails and rollers are disposed on opposite sides of the lower linear guide rail in parallel relation therewith for smoothly moving the intermediate plate with respect to the lower face plate in one linear direction. In the upper area, one upper linear guide rail is disposed in. the center of the area and guide rails and rollers are disposed on opposite sides of the upper linear guide rail in parallel relation therewith for smoothly moving the upper face plate with respect to the intermediate plate in one linear direction. The lower linear guide rail and the upper linear guide rail orthogonally cross each other, and the guide rails and rollers in the lower area and the upper area orthogonally cross each other.

11 Claims, 5 Drawing Sheets

SEISMIC ISOLATOR FOR EXHIBITS

BACKGROUND OF THE INVENTION

1. Field of the Invention

The present invention relates to a seismic isolator for exhibits that will protect exhibits at museums, art galleries, etc., from earthquakes and other vibrations.

2. Description of the Prior Art

FIG. 8 is a perspective view of a conventional seismic isolator that uses linear guide rails. A plurality of lower linear guide rails 2 are lined up in a single linear direction and fixedly attached to the upper surface of a support stand 1, which is fixed to the top of a foundation.

A plurality of upper linear guide rails 4 are lined up in another linear direction, that is, a direction at a right angle to the lower linear guide rails 2 mentioned above, and fixedly attached to the lower surface of a pedestal carrying an exhibit, a display case, or other seismic isolation object 3.

A coupling block 5 is placed between each of the lower linear guide rails 2 and the upper linear guide rails 4. the lower section of the coupling block 5 is supported, through a ball, so that it can move smoothly along the lower linear guide rails 2. The upper section of the coupling block 5 supports, through a ball and together with the upper linear guide rails 4, the seismic isolation object 3 so that it can slide smoothly in the longitudinal direction of the upper guide rails 4.

With this, the seismic isolation object 3, within the length of the lower linear guide rails 2 and the upper guide rails 4, is supported so that it can move smoothly in all horizontal directions. However, the ends of plural numbers of coiled restoring springs 6, placed in parallel to the lower linear guide rails 2 and the upper linear guide rails 4, are attached to the upper surface of the support stand 1 and the lower surface of the seismic isolation object 3. They protect by restoring the seismic isolation object 3 to its original position before it moved horizontally, and by relieving vibrations in the horizontal direction.

FIG. 9 is a vertical cross sectional view of another conventional seismic isolator that uses curved faces. A plurality of support blocks 9 are installed in the lower surface of a lower face plate 7 by set screws 8, and the lower face plate 7 is fixed to the top of a foundation that is not shown, through the support blocks 9. Sphere support caps 10 are fixed to the upper surface of the lower face plate 7, and spheres 11 are rotatably supported on top of the support caps 10, through ball bearings.

An upper face plate 12 is placed above the lower face plate 7, and a seismic isolation object, not shown, such as a pedestal carrying an exhibit or a display case, is installed on top of the upper face plate 12.

A support plate 14 is fixedly attached to the lower surface of the upper face plate 12, and a curved surface 1II with a concave spherical shape is formed on the lower side of the plate 14. The curved surface 13 is set on top of the sphere 11, supporting the upper face plate 12.

A bolt 15 is installed in the center of the lower surface of the upper face plate 12. The bolt 15 is passed through a large hole 16 bored in the center of the lower face plate 7, and a stop plate 17 is installed at the lower end. A cover 18 is installed around the periphery of the upper face plate 12.

When the seismic isolator of FIG. 9 above is exposed to the vibrations of an earthquake, etc., the upper face plate 12 can move freely in all horizontal directions through a support plate 14 set on top of the sphere 11. Horizontal vibrations of the upper face plate 12 are relieved by a restorative force that arises from the weight loaded onto the sphere 11 from the curved surface 13. A seismic isolation object such as a pedestal carrying an exhibit or a display case, installed on top of the upper face plate 12 is thus protected from vibrations.

Three or more coupling blocks 5 are required with the conventional seismic isolator shown in FIG. 8, in order to maintain horizontal the seismic isolation object 3 supported on the lower linear guide rails 2. Supposing a displacement amplitude of 200 mm in a single direction is required, the lower linear guide rails 2 and the upper linear guide rails 4 of 200 mm each will be needed on both sides of the three or more coupling blocks 5. Thus a problem exists in miniaturizing the seismic isolator.

Further, coupling blocks are not used in the conventional seismic isolator shown in FIG. 9. The sphere 11 is sandwiched between the lower face plate 7 and the upper face plate 12. Supposing a displacement amplitude of 200 mm in a single direction is required, since a displacement is provided from the vertical deviations, the curved surface 13 must have a radius of 200 mm or more. Thus problems exist in miniaturizing the seismic isolator, and in its high cost since a very large expense will be incurred in manufacturing the support plate 14 furnished with the curved surface 13.

SUMMARY OF THE INVENTION

The object of the present invention is to solve these problems by providing a seismic isolator for exhibits that are small, that can relieve large vibrations, and that is inexpensive.

The present invention relates to a flat-type seismic isolator for exhibits comprising: a lower face plate installed on a foundation; an upper face plate that is installed to the lower surface of a seismic isolation object and placed above the lower face plate; an intermediate plate placed between the upper face plate and the lower face plate; and elastic restoring means and damping means provided for returning the plates to their original positions and placed in a lower area between the lower face plate and the intermediate plate and an upper area between the intermediate plate and the upper face plate, respectively, wherein: in the lower area, one lower linear guide rail is disposed in the center of the area and guide rails and rollers are disposed at both ends parallel to the lower linear guide rail for smoothly moving the intermediate plate with respect to the lower face plate in one linear direction; and in the upper area, one upper linear guide rail is disposed in the center of the area and guide rails and rollers are disposed at both ends parallel to the upper linear guide rail for smoothly moving the upper face plate with respect to the intermediate plate in one linear direction, the lower linear guide rail and the upper linear guide rail orthogonally crossing each other, the guide rails and the rollers in the lower area and the upper area orthogonally crossing each other. Through the guide rails and rollers, the upper face plate can move smoothly in all horizontal directions, and by the elastic restoring metals, the upper face plate is restored to its original position, and horizontal vibrations are relieved. The height of the entire device is reduced to a small size.

In a further aspect, the seismic isolator for exhibits set forth above further comprises damping means of a magnet disposed in the lower area between the lower face plate and the intermediate plate and in the upper area between the intermediate plate and the upper face plate. By use of only a magnet, vibration displacement can easily be damped.

DETAILED DESCRIPTION OF THE PREFERRED EMBODIMENTS

Embodiments of the present invention are explained below with reference to the drawings.

Figure 1:
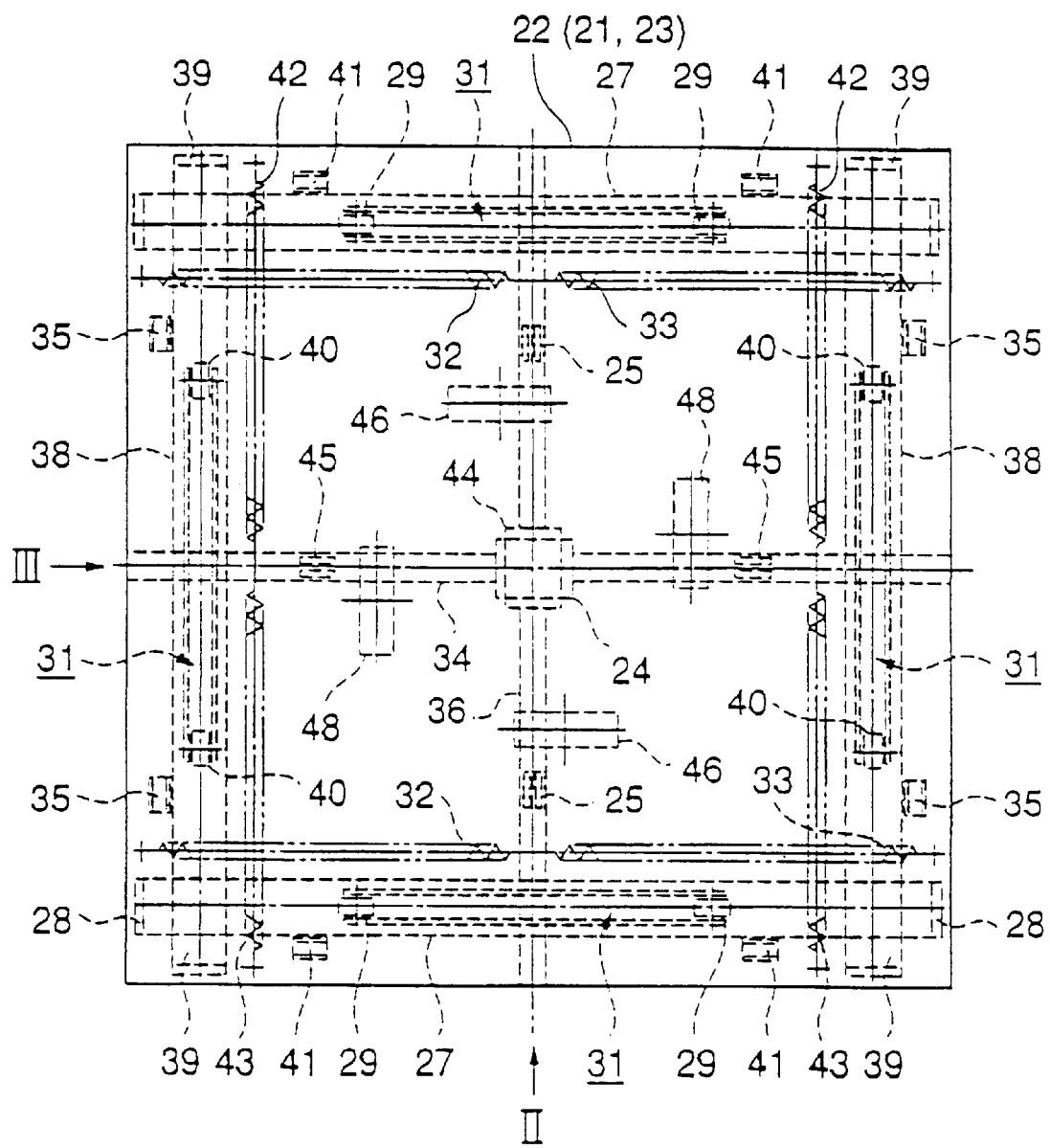
FIG. 1 is a plan view showing an example of an embodiment of the present invention.
Figure 2:
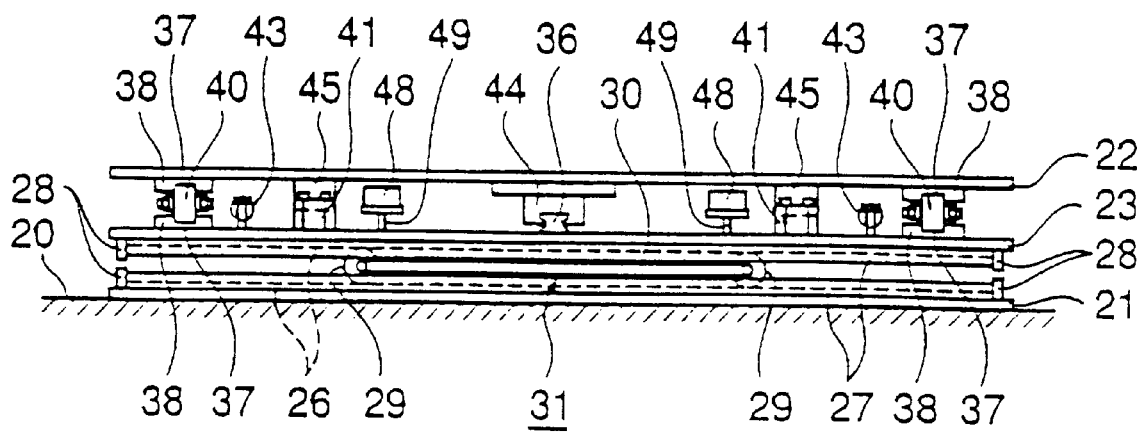
FIG. 2 is a front view of FIG. 1 looking from the II direction.
Figure 3:
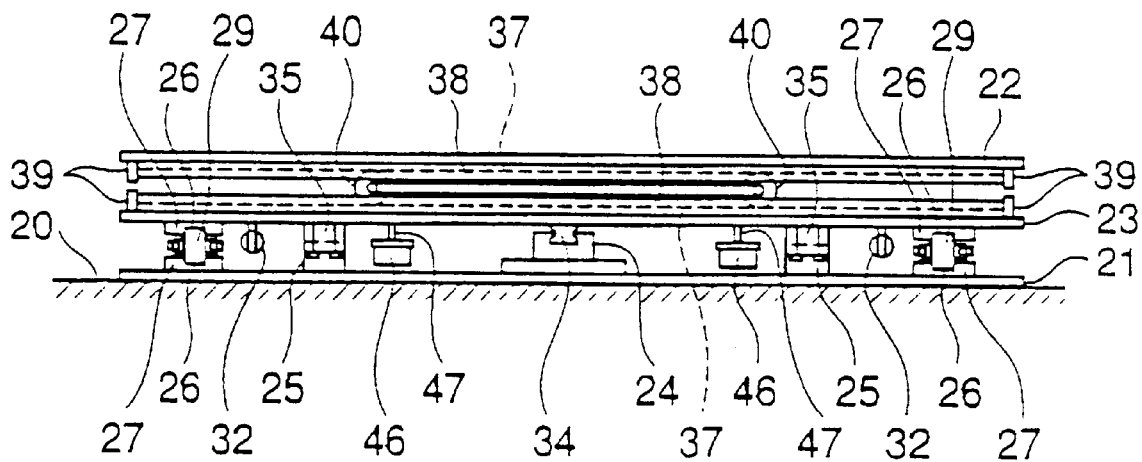
FIG. 3 is a side view of FIG. 1 looking from the III direction.

FIG. 1 is a plan view showing an example embodiment. of the present invention, FIG. 2 is a front view of FIG. 1 looking from the II direction, and FIG. 3 is a side view of FIG. 1 looking from the III direction. The seismic isolator for exhibits of the present invention, as shown in FIG. 2 and FIG. 3, comprises: a lower face plate 21 installed on a foundation 20; an upper face plate 22 placed above the lower face plate 21, and installed on the lower surface of a seismic isolation object which is not shown, such as a pedestal holding an exhibit or a display case; and an intermediate plate 23 that is placed horizontally between the lower face plate 21 and the upper face plate 22. As shown in FIG. 1, the upper face plate 22 is a flat plate with nearly a square shape, and the intermediate plate 23 and the lower face plate 21 are also square flat plates made with the same dimensions. The similarly shaped intermediate plate 23 and the upper face plate 22 are stacked on top of the lower face plate 21 in FIG. 1, with a space left between each.

Figure 4:
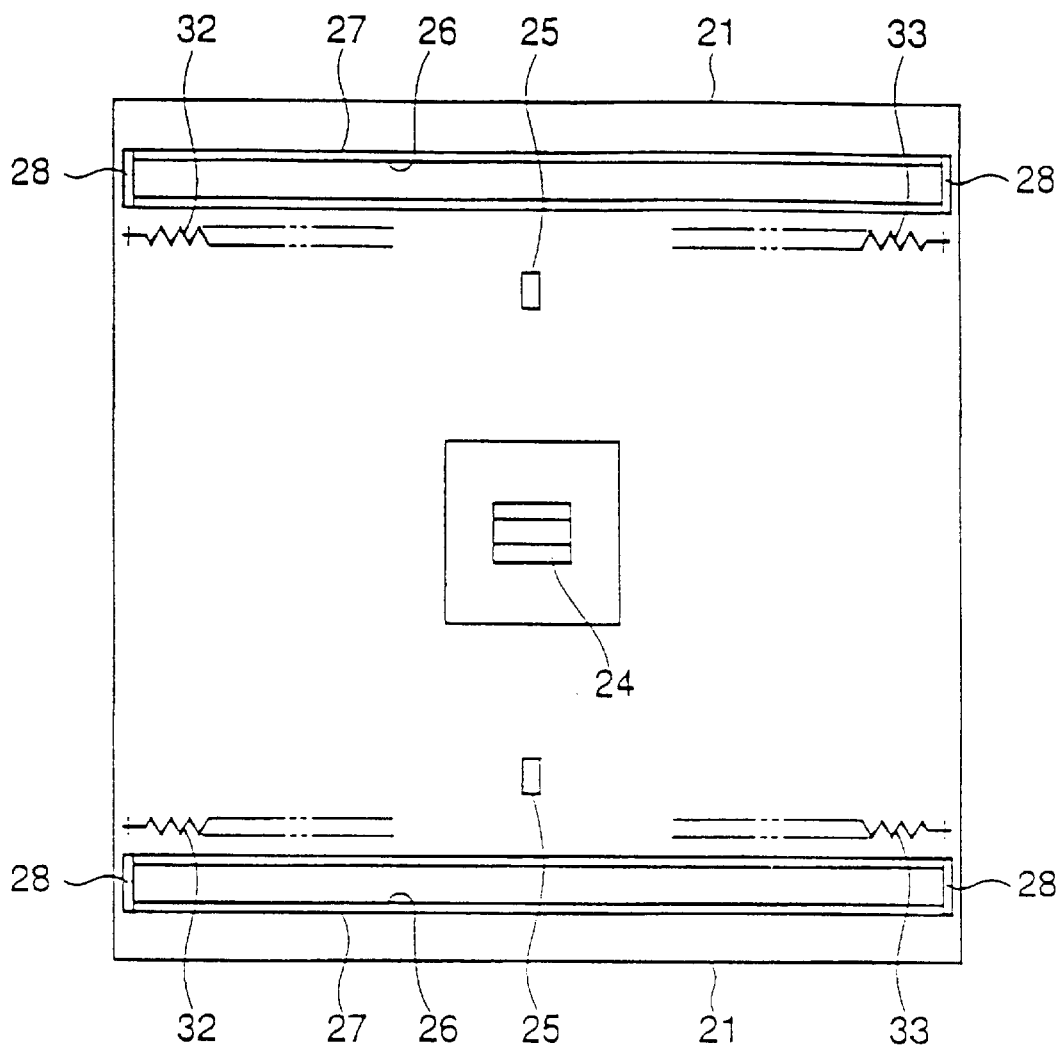
FIG. 4 is a plan view showing an example of an embodiment of a lower face plate used in the present invention.

FIG. 4 is a plan view showing an example embodiment of the lower face plate 21. A coupling block 24, also shown in FIG. 3, is installed in the center of the upper surface of the lower face plate 21, and stoppers 25, with shock absorbing rubber affixed, are installed above and below the coupling block 24 in FIG. 4.

In addition, roller guide rails 27, having concave grooves 26 on its upper surface, are installed on the upper surface of the lower face plate 21 in the vicinity of the upper and lower edges and in the right-left direction of FIG. 4. This is the vertical direction within the paper for FIG. 3 (hereafter referred to as the "X-direction"). Roller stop plates 28 are fixed at both ends of the roller guide rails 27. Rollers 29 are fit into the concave grooves 26 of the roller guide rails 27, as shown in FIG. 2 and FIG. 3, and roll and move along the concave grooves 26.

Figure 5:
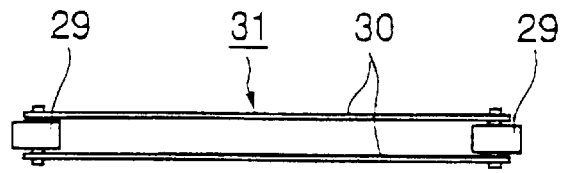
FIG. 5 is a plan view showing an example of an embodiment of the roller used in the present invention.

For the rollers 29, as shown in the front view of FIG. 2 as well as in the plan view of FIG. 5, two rollers 29 are put together by a coupling plate 30 so that their axes are parallel, forming a roller unit 31.

Restoring springs 32 and 33, coil springs, are disposed along the roller guide rails 27 on the upper surface of the lower face plate 21, as shown in FIG. 4. The outer ends of the restoring springs 32 and 33 are engaged in the vicinity of the edge of the upper surface of the lower face plate 21, while the inner ends of the restoring springs 32 and 33 are engaged on the centerline of the lower surface of the intermediate plate 23, as shown in FIG. 1 and FIG. 3.

The coupling block 24, installed in the center of the upper surface of the lower face plate 21 and mentioned above, holds an X-direction guide rail 34 as the lower linear guide rail, fixedly attached to the lower surface of the intermediate plate 23 in the X-direction, through a ball, so that it can slide smoothly in the longitudinal direction of the rail 34, as shown in FIG. 1 and FIG. 3.

On the lower surface of the intermediate plate 23, in addition to the fixedly-attached X-direction guide rail 34, mentioned above, roller guide rails 27, which have concave grooves 26 on its lower surface, (refer to FIG. 2 and FIG. 3), are installed in the X-direction so that they face the aforementioned roller guide rails 27 on the upper surface of the lower face plate 21. Roller stop plates 28 are affixed to both ends of the roller guide rails 27.

The concave grooves 26, on the roller guide rails 27 installed on the lower surface of the intermediate plate 23, fit onto the rollers 29 from above, as shown in FIG. 2 and FIG. 3. The intermediate plate 23 is guided by the concave grooves 26 and the X-direction guide rails 34, and can move smoothly in the X-direction with respect to the lower face plate 21.

When the intermediate plate 23 moves in the X-direction with respect to the lower face plate 21, in order to stop the plate 23 from slipping and falling from the plate 21, stoppers 35, with shock absorbing rubber affixed, are installed on both sides of the lower surface of the intermediate plate 23 in the X-direction, facing the stoppers 25 on the upper surface of the lower face plate 21, as shown in FIG. 1 and FIG. 3.

Following the top to bottom direction in FIG. 1, which is the vertical direction within the paper for FIG. 2 (hereafter referred to as the "Y-direction"), a Y-direction guide rail 36 as the upper linear guide rail is attached in the center section of the upper surface of the intermediate plate 23. In addition, roller guide rails 38, whose upper surfaces contain concave grooves 37, are installed in the vicinity of the edges of the Y-direction on the upper surface of the intermediate plate 23. Roller stop plates 39 are fixed at both ends of the roller guide rails 38, as shown in FIG. 3. Rollers 40 (refer to FIG. 1 or FIG. 3) of the roller units 31 (refer to FIG. 1), similar to the rollers 29 explained by FIG. 5, are fit into the grooves 37 on the roller guide rails 38, and can roll and move along the concave grooves 37.

Stoppers 41, with shock absorbing rubber affixed, are installed in the vicinity of the edges in the X-direction on the upper surface of the intermediate plate 23 so that they face each other, as shown in FIG. 1 and FIG. 2.

Restoring springs 42 and 43, i.e. coil springs, are disposed along the roller guide rails 38 on the upper surface of the intermediate plate 23, as shown in FIG. 1 and FIG. 2. The outer ends of the restoring springs 42 and 43 are engaged in the vicinity of the edges in the X-direction of the upper surface of the intermediate plate 23, while the inner ends of the restoring springs 42 and 43 are engaged on the centerline of the lower surface of the upper face plate 22.

As shown in FIG. 1 and FIG. 2, a coupling block 44 is installed in the center of the lower surface of the upper face plate 22. The coupling block 44 holds the Y-direction guide rail 36, fixedly attached to the upper surface of the intermediate plate 23 in the Y-direction, through a ball, so that it can slide smoothly in the longitudinal direction of the Y-direction guide rail 36.

Roller guide rails 38, whose lower surfaces contain concave grooves 37, (refer to FIG. 2, FIG. 3) are installed in the Y-direction on the lower surface of the upper face plate 22, so that they face the aforementioned roller guide rails 38 installed on the upper surface of the intermediate plate 23, mentioned above. Roller stop plates 39 are fixed to both ends of the roller guide rails 38, as shown in FIG. 1 and FIG. 3.

The concave grooves 37, on the roller guide rails 38 installed on the lower surface of the upper face plate 22, fit onto the rollers 40 from above, as shown in FIG. 2 and FIG. 3. The upper face plate 22 is guided by the concave grooves 37 and the Y-direction guide rails 36, and can move smoothly in the Y-direction with respect to the intermediate plate 23.

When the upper face plate 22 moves in the Y-direction with respect to the intermediate plate 23, in order to stop the plate 22 from slipping and falling from the plate 23, stoppers 45, with shock absorbing rubber affixed, are installed on the X-direction centerline of the lower surface of the upper face plate 22, between the stoppers 41 on the upper surface of the intermediate plate 23, as shown in FIG. 1 and FIG. 2.

As a damping means, magnets 46 are installed on the lower face of the intermediate plate 23, through rods 47 whose length can be controlled, so that the magnets face the lower face plate 21, as shown in FIG. 1 and FIG. 3. Further, as the damping means, magnets 48 are installed on the upper face of the intermediate plate 23, through rods 49 whose length can be controlled, so that the magnets face the upper face plate 22, as shown in FIG. 1 and FIG. 2.

In order to operate the magnets 46 and 48 as damping means against motion displacement, non-magnetic plates are installed on the upper surface of the lower face plate 21 so as to face the magnets 46, and non-magnetic plates are also installed on the lower surface of the upper face plate 22 facing the magnets 48. Or, the lower face plate 21 and the upper face plate 22 can themselves be non-magnetic plates, and motion displacement can be damped through the overcurrent that is generated when the motion displacement takes place.

Next, the operation of the above mentioned seismic isolator for exhibits shown in FIGS. 1 through 3 is explained.

If the lower face plate 21 is displaced in a horizontal direction by a horizontal vibration, the upper face plate 22, and the seismic isolation object such as a pedestal carrying an exhibit or a display case, installed on the plate 22 resist the vibration so as to maintain their positions due to inertia.

Figure 6:
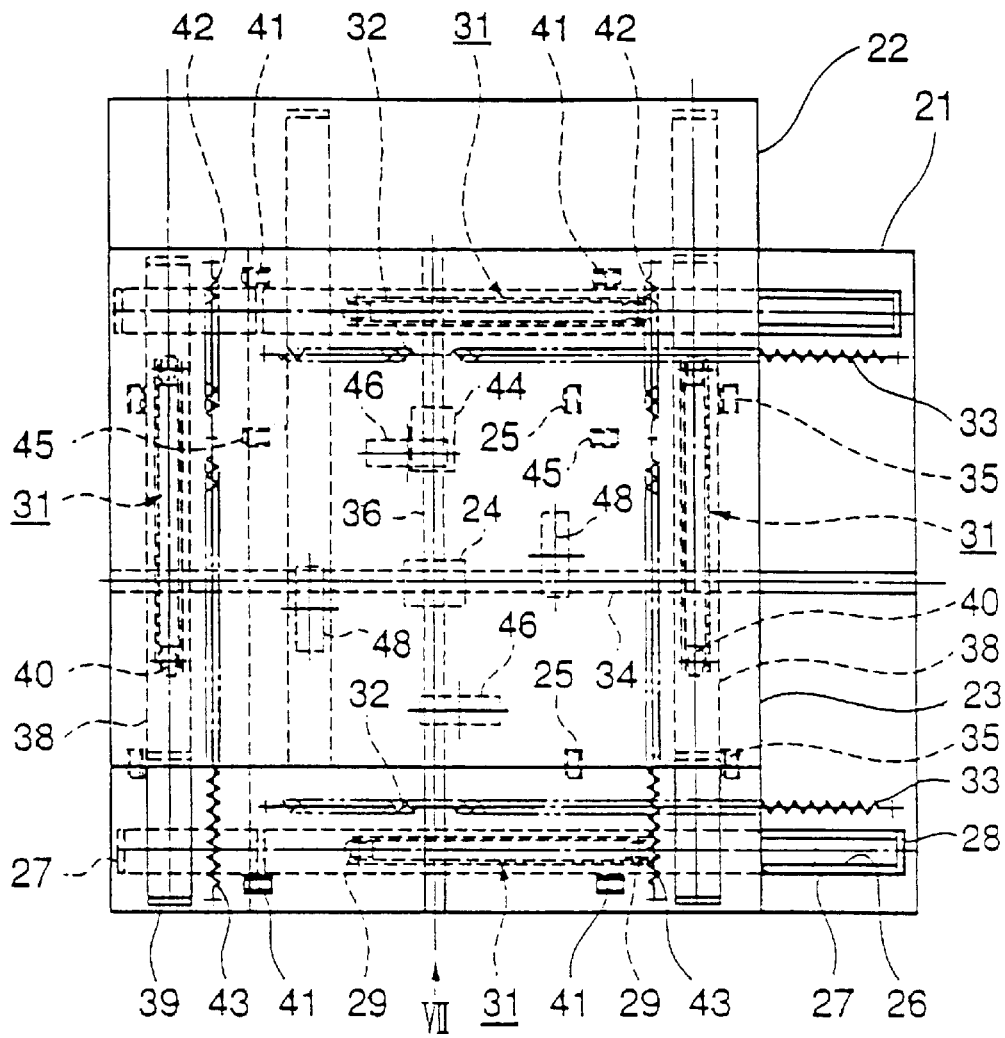
FIG. 6 is a plan view showing an example of the operating state of the present invention.
Figure 7:
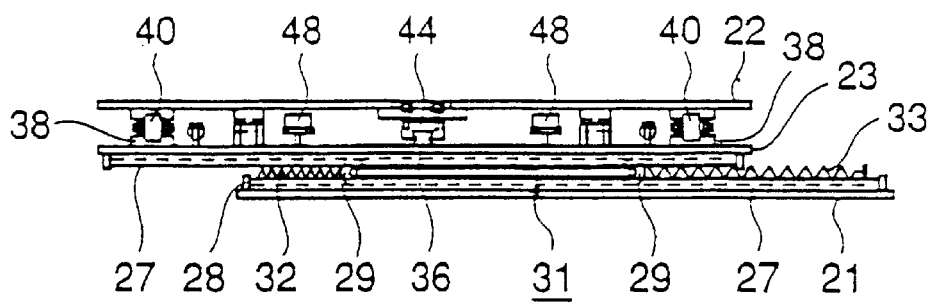
FIG. 7 is a front view of FIG. 6 looking from the VII direction.
Figure 8:
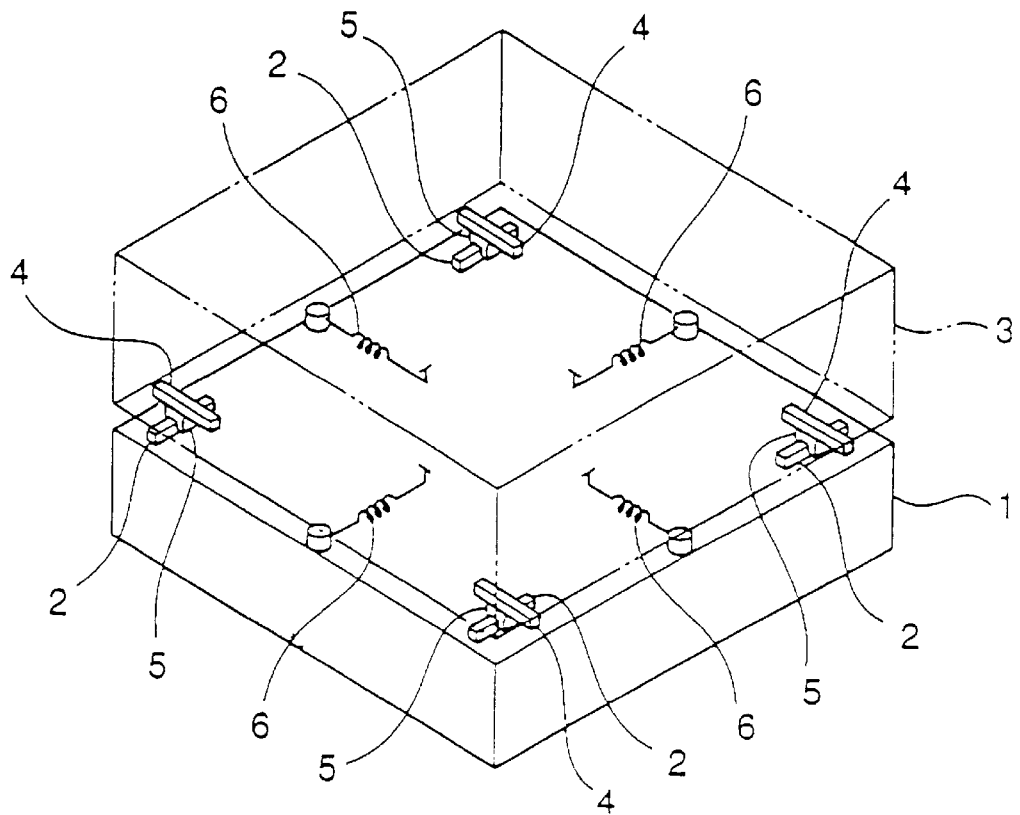
FIG. 8 is a perspective view of a conventional seismic isolator that uses linear guide rails.
Figure 9:
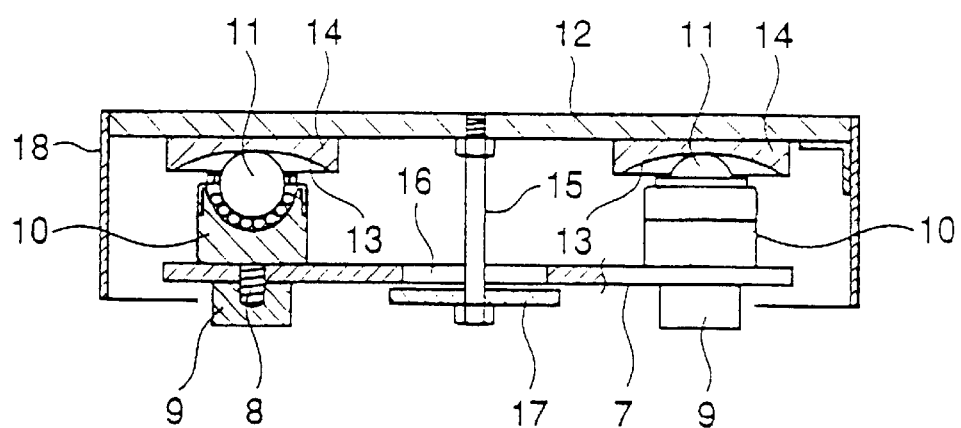
FIG. 9 is a vertical cross sectional view of another conventional seismic isolator that uses curved faces.

FIG. 6 is a plan view showing a vibration displacement of the lower face plate 21 at a 45° angle with respect to both the X-direction and the Y-direction, and FIG. 7 is a front view of FIG. 6 looking from the VII direction. In this case, the lower face plate 21 is displaced in the X-direction with respect to the intermediate plate 23 and the upper face plate 22, and the intermediate plate 23 and the lower face plate 21 are displaced in the Y-direction with respect to the upper face plate 22.

When the lower face plate 21 is displaced in the X-direction with respect to the intermediate plate 23, the coupling block 24 installed in the center of the upper surface of the lower face plate 21 moves smoothly in the X-direction with respect to the X-direction guide rail 34 fixedly attached in the X-direction to the lower surface of the intermediate plate 23. The roller guide rail 27 on the upper surface of the lower face plate 21 rotates the roller 29 and moves in the X-direction.

Then as shown in FIG. 7, the restoring spring 32 contracts, the restoring spring 33 expands, generating a restoring force, while the magnets 46 generate a damping force. In addition, even if the displacement of the lower face plate 21 in the X-direction is large, the stopper 35 contacts the stopper 25, the roller 29 contacts the roller stop plate 28, so the intermediate plate 23 does not slip and fall off of the lower face plate 21.

When the lower face plate 21 is displaced by vibration at a 45° angle with respect to both the X-direction and the Y-direction, and the intermediate plate 23 is displaced in the Y-direction with respect to the upper face plate 22, the Y-direction guide rail 36 fixedly attached in the Y-direction to the upper surface of the intermediate plate 23 moves smoothly in the Y-direction with respect to the coupling block 44 fixedly attached in the center of the lower surface of the upper face plate 22. The roller guide rail 38 on the upper surface of the intermediate plate 23 rotates the roller 40 and moves in the Y-direction.

Then the restoring spring 42 contracts, the restoring spring 43 expands, generating a restoring force, and the magnets 48 generate a damping force. In addition, even if the displacement of the intermediate plate 23 in the Y-direction is large, the stopper 41 contacts the stopper 45, the roller 40 contacts the roller stop plate 39, so the upper face plate 22 does not slip and fall off of the intermediate plate 23.

The damping force from the magnets 46 and 48 can be regulated by expanding or contracting the length adjustable rods 47 and 49 so as to change the clearance between the lower face plate 21 and the magnet 46 or the upper face plate 22 and the magnet 48.

The invention can be installed into even the narrow space within a display case, because it is a small device with a low height. Since its permissible displacement range is large, a seismic isolation object such as an exhibit in a museum, art gallery, etc., is maintained horizontal upon vibration and effectively isolated. As a further effect, since the seismic isolator can be assembled with minimized number of high cost rails by using rollers, the overall cost can be significantly reduced.

In the further aspect, the seismic isolator has the effect of being able to provide stability by quickly damping out vibration displacement through use of inexpensive magnets.

What is claimed:

1. A flat-type seismic isolator for preventing damage to an object due to vibrations, said isolator comprising:

a lower face plate for attachment to a foundation;

an upper face plate for attachment to a lower surface of the object, said upper face plate being disposed above said lower face plate;

an intermediate plate disposed between said upper and lower face plates;

an elastic restoring arrangement and a damping arrangement for returning said lower face plate, said upper face plate and said intermediate plate to their respective original positions relative to one another after a vibration occurs, said elastic restoring arrangement and said damping arrangement being disposed both in a lower area defined between said lower face plate and said intermediate plate and in an upper area defined between said intermediate plate and said upper face plate;

an elongate and linear lower coupling rail mounted in said lower area on one of said intermediate plate and said lower face plate and a lower coupling member mounted in said lower area generally centrally on the other said plate, said lower coupling member slidingly engaging said lower coupling rail to slidingly couple said intermediate plate and said lower face plate to one another and prevent detachment of said lower face plate and said intermediate plate from one another in a direction orthogonal to the planes defined by the respective plates, said lower coupling member and said lower coupling rail being the sole coupling components in said lower area, a pair of elongate and linear lower guide rail structures disposed in said lower area on respective opposite sides of, and in parallel relation with said lower coupling rail, and rollers engaged with each said lower guide rail structure for smoothly and linearly moving said intermediate plate with respect to said lower face plate, said lower guide rail structures and the respective rollers maintaining said intermediate plate in a horizontal orientation; and an elongate and linear upper coupling rail mounted in said upper area on one of said intermediate plate and said upper face plate and an upper coupling member mounted in said upper area generally centrally on the other said plate, said upper coupling member slidingly engaging said upper coupling rail to slidingly couple said intermediate plate and said upper face plate to one another and prevent detachment of said upper face plate and said intermediate plate from one another in a direction orthogonal to the planes defined by the respective plates, said upper coupling member and said upper coupling rail being the sole coupling components in said upper area, a pair of elongate and linear upper guide rail structures disposed in said upper area on respective opposite sides of, and in parallel relation with said upper coupling rail, and rollers engaged with each said upper guide rail structure for smoothly and linearly moving said upper face plate with respect to said intermediate plate, said upper guide rail structures and the respective rollers maintaining said upper face plate in a horizontal orientation, said upper and lower coupling rails being disposed in orthogonal relation with one another and said pair of upper guide rail structures being disposed in orthogonal relation with said pair of lower guide rail structures.

2. The seismic isolator of claim 1 wherein each of said lower and upper guide rail structures are defined by a pair of upper and lower elongate guide rails each defining an elongate groove therein, said upper and lower guide rails and the respective grooves thereof being disposed in opposed relation with one another, the respective rollers being sandwiched between said upper and lower guide rails and engaged within the opposed grooves thereof.

3. The seismic isolator of claim 2 wherein the respective pairs of upper and lower guide rails are vertically aligned with one another and said grooves thereof open downwardly and upwardly, respectively.

4. The seismic isolator of claim 2 wherein said lower coupling rail is disposed at substantially equal distances from opposite parallel edges of said one intermediate and lower face plate and said lower guide rail structures extend along the respective edges in generally parallel relation therewith on opposite sides of said lower coupling rail, and said upper coupling rail is disposed at substantially equal distances from opposite parallel edges of said one intermediate and upper face plate and said upper guide rail structures extend along the respective edges of said one intermediate and upper face plate in generally parallel relation therewith on opposite sides of said upper coupling rail.

5. The seismic isolator of claim 4 wherein said elastic restoring arrangement includes a pair of spring members disposed in said lower area in generally parallel relation with each pair of opposed upper and lower guide rails, outer terminal ends of said spring members being respectively connected to said lower face plate adjacent respective parallel edges thereof which are orthogonal with respect to the respective parallel edges of said one intermediate and lower face plate, inner terminal ends of said spring members being connected to said intermediate plate adjacent a centerline thereof, and a pair of spring members disposed in said upper area in generally parallel relation with each pair of opposed upper and lower guide rails, outer terminal ends of said spring members in said upper area being respectively connected to said intermediate plate adjacent respective parallel edges thereof which are orthogonal with respect to the respective parallel edges of said one intermediate and upper face plate, and inner terminal ends of said spring members in said upper area being connected to said upper face plate adjacent a centerline thereof.

6. The seismic isolator of claim 5 wherein said spring members are coil springs.

7. The seismic isolator of claim 2 wherein a pair of said rollers are disposed between each opposed pair of upper and lower guide rails, said pairs of rollers being connected to one another by a plate member such that the rotational axes of said rollers are horizontal and parallel with one another and orthogonal relative to the elongated direction of the respective opposed pair of upper and lower guide rails.

8. The seismic isolator of claim 2 wherein each said upper and lower guide rail includes a stop plate adjacent a transverse terminal edge thereof to confine the respective rollers within the opposed grooves, a pair of stop members are disposed on and project upwardly from an upper surface said lower face plate which are engageable with correspondingly located stop members disposed on and projecting downwardly from a lower surface of said intermediate plate to prevent detachment of said intermediate plate from said lower face plate, and a pair of stop members are disposed on and project upwardly from an upper surface of said intermediate plate which are engageable with correspondingly located stop members disposed on and projecting downwardly from a lower surface of said upper face plate to prevent detachment of said upper face plate from said intermediate plate.

9. The seismic isolator of claim 2 wherein said lower coupling member comprises a coupling block centrally mounted on an upper surface of said lower face plate and said lower coupling rail is mounted on a lower surface of said intermediate plate, and said upper coupling member comprises a coupling block centrally mounted on a lower surface of said upper face plate and said upper coupling rail is mounted on an upper surface of said intermediate plate.

10. The seismic isolator of claim 1 wherein said damping arrangement includes at least one magnet disposed in each of said upper and lower areas for damping vibrations solely through horizontal displacement of said intermediate plate and said upper plate.

11. The seismic isolator of claim 10 wherein said magnet in said upper area is adjustably mounted on an upper surface of said intermediate plate and said magnet in said lower area is adjustably mounted on a lower surface of said intermediate plate.

* * * * *